United States Patent [19]
Hattori

[11] Patent Number: 6,094,632
[45] Date of Patent: Jul. 25, 2000

[54] SPEAKER RECOGNITION DEVICE

[75] Inventor: Hiroaki Hattori, Tokyo, Japan

[73] Assignee: NEC Corporation, Tokyo, Japan

[21] Appl. No.: 09/015,757

[22] Filed: Jan. 29, 1998

[30] Foreign Application Priority Data

Jan. 29, 1997 [JP] Japan .................................. 9-015595

[51] Int. Cl.⁷ ............................................... G10L 15/00
[52] U.S. Cl. ..................... 704/239; 704/246; 704/249; 704/250; 379/88.01; 379/88.02; 379/88.03
[58] Field of Search .................................. 704/246, 249, 704/250, 239

[56] References Cited

U.S. PATENT DOCUMENTS

| | | | |
|---|---|---|---|
| 4,987,480 | 1/1991 | Lippman et al. .......................... | 358/13 |
| 5,414,755 | 5/1995 | Bahler ..................................... | 704/236 |
| 5,548,647 | 8/1996 | Naik ........................................ | 704/236 |
| 5,774,525 | 6/1998 | Kanevsky et al. ........................ | 379/88 |

FOREIGN PATENT DOCUMENTS

| | | |
|---|---|---|
| 0 810 737 | 12/1997 | European Pat. Off. . |
| 5-323990 | 12/1993 | Japan . |

OTHER PUBLICATIONS

Watanabe, "Unknown Utterance Rejection Using Likelihood Normalization Based On Syllable Recognition", *The Transactions of the Institute of Electronics, Information and Communication Engineers*, vol. J75–D–II, No. 12, pp. 2002–2009, (1992).

Sakoe et al., "Recognition of Continuously Spoken Words Based on Time–Normalization by Dynamic Programming", *The Journal of the Acoustical Society of Japan*, vol. 27(9):483–490, (1971).

Rosenberg et al., "Evaluation of a Vector Quantization Talker Recognition System In Text Independent And Text Dependent Modes", *proc. of ICASSP 86*, pp. 873–876, (1986).

Reynolds, "The Effects of Handset Variability On Speaker Recognition Performance: Experiments On The Switchboard Corpus", *Proc. of ICASSP 96*, pp. 113–116, (1996).

"Speaker Adaptation For Demi–Syllable Based Speech Recognition Using HMM", *Proceedings of the Autumn Meeting of the Acoustical Society of Japan*, pp. 23–24, (1990).

Higgins et al., "speaker Verification Using Randomized Phrase Prompting", *Digital Signal Processing*, vol. 1:89–108, (1991).

Tomoko Matsui et al, "Speaker Adaptation of Tied–Mixed–Based Phoneme Models for Text–Prompted speaker Recognition", Proceedings of the International Conference on Acoustics, Speech, Signal Processing (ICASSP), Speech Processing 1. Adelaide, Apr. 19–22, 1994, vol. 1, Apr. 19, 1994, pp. I–125–I–128, XP000529372 Institute of Electrical and Electronics Engineers.

Patent Abstracts of Japan, vol. 018, No. 149 (P–1708), Mar. 11, 1994 & JP 05 323990 A (Nippon Telegr & Teleph Corp), Dec. 7, 1993.

V. Jacobson: *Congestion Avoidance and Control*, Computer Communications Review, vol. 25, No. 1, Jan. 1, 1995, pp. 158–173.

*Primary Examiner*—Krista Zele
*Attorney, Agent, or Firm*—Foley & Lardner

[57] ABSTRACT

A speaker recognition device for judging whether or not an unknown speaker is an authentic registered speaker himself/herself executes 'text verification using speaker independent speech recognition' and 'speaker verification by comparison with a reference pattern of a password of a registered speaker'. A presentation section instructs the unknown speaker to input an ID and utter a specified text designated by a text generation section and a password. The 'text verification' of the specified text is executed by a text verification section, and the 'speaker verification' of the password is executed by a similarity calculation section. The judgment section judges that the unknown speaker is the authentic registered speaker himself/herself if both the results of the 'text verification' and the 'speaker verification' are affirmative. According to the device, the 'text verification' is executed using a set of speaker independent reference patterns, and the 'speaker verification' is executed using speaker reference patterns of passwords of registered speakers, thereby storage capacity for storing reference patterns for verification can be considerably reduced. Preferably, 'speaker identity verification' between the specified text and the password is executed.

20 Claims, 6 Drawing Sheets

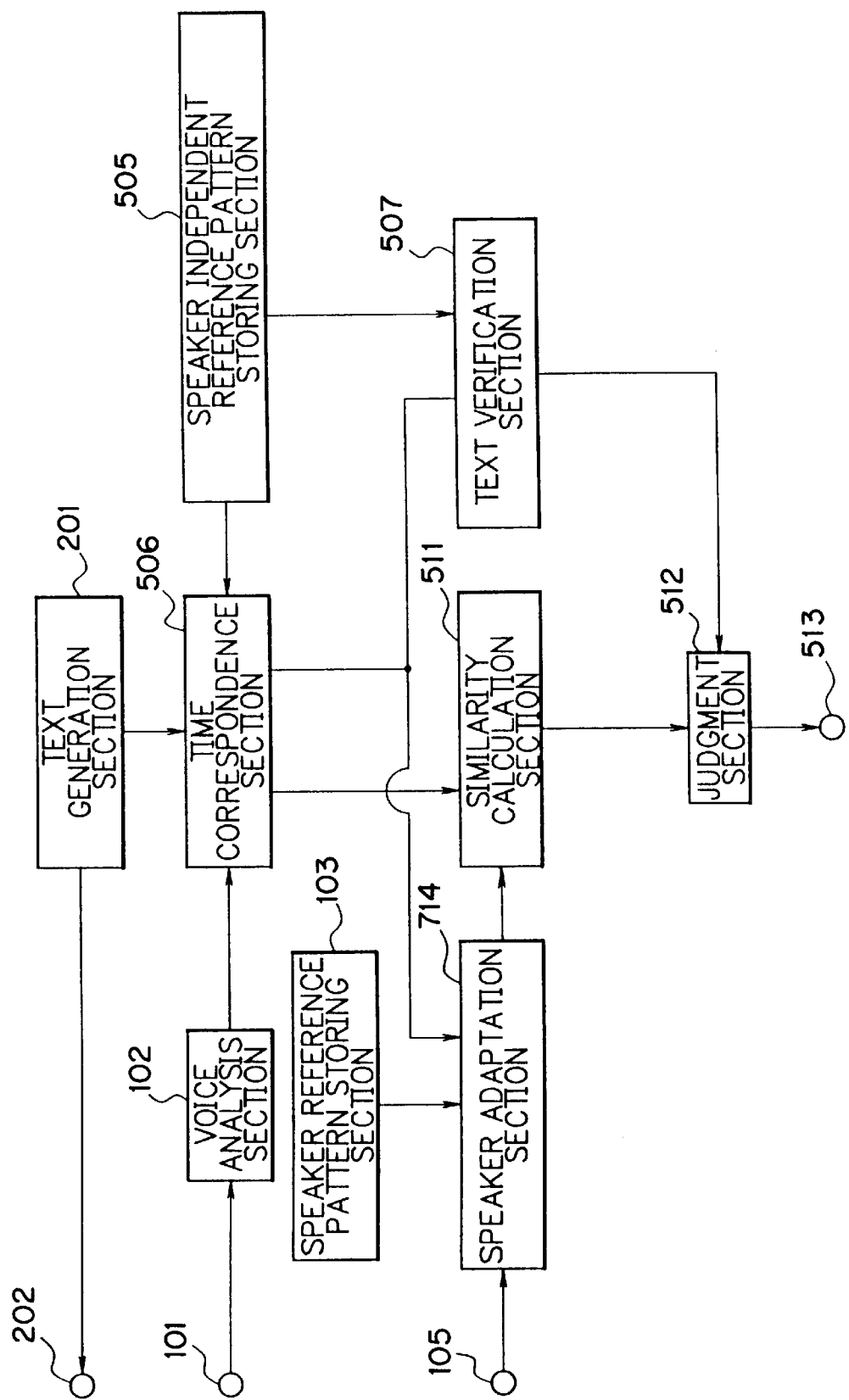

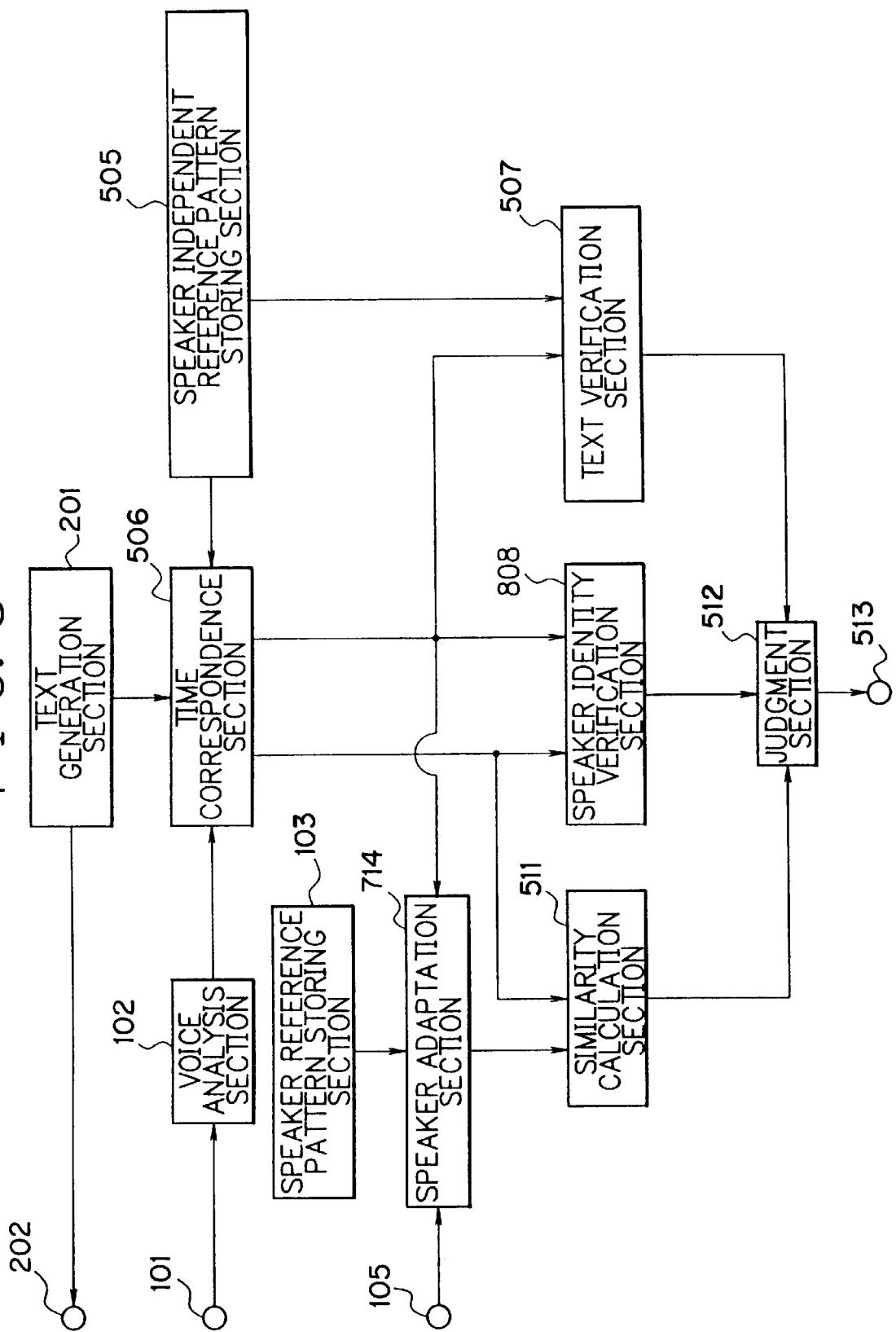

SPEAKER RECOGNITION DEVICE

BACKGROUND OF THE INVENTION

The present invention relates to a speaker recognition device for executing recognition or verification of speakers, and in particular, to a speaker recognition device for identifying an unknown speaker as a registered speaker or not.

DESCRIPTION OF THE RELATED ART

At the outset, a brief explanation of speaker identification will be given. FIG. 1 is a block diagram showing functional blocks of a conventional speaker recognition device. The device of FIG. 1 comprises a voice input terminal 101, a voice analysis section 102, a speaker reference pattern storing section 103, a similarity calculation section 104, a speaker information input terminal 105, a judgment section 106, and an output terminal 107.

A voice signal generated according to voice input of an unknown speaker to a microphone etc. is supplied to the voice input terminal 101. The voice analysis section 102 executes sound analysis of the inputted voice signal and generates an input pattern which is composed of time sequences of feature values of the inputted voice signal. Information for identifying a speaker such as speaker name, speaker ID, etc. is inputted by the unknown speaker and is supplied to the speaker information input terminal 105. In the speaker reference pattern storing section 103, a plurality of reference patterns which represent acoustic features of passwords spoken by registered speakers (customers) are stored. The similarity calculation section 104 identifies one registered speaker who corresponds to the information inputted to the speaker information input terminal 105, reads out a reference pattern of the identified registered speaker from the speaker reference pattern storing section 103, and calculates the degree of similarity between the reference pattern and the input pattern generated by the voice analysis section 102. The judgment section 106 compares the calculated degree of similarity with a predetermined threshold value, and judges that the unknown speaker is the identified registered speaker himself/herself if the degree of similarity is larger than the threshold value, and otherwise, judges that the unknown speaker is an impostor. The judgment is outputted to the output terminal 107.

However, with such speaker recognition devices, imposture (i.e. identity misrepresentation) may be easily done by recording a password of desired person on speaker registration or on speaker identification and playing back the recorded words. In order to avoid such type of imposture, there is proposed a speaker recognition method which is disclosed in Japanese Patent Application Laid-Open No. HEI5-323990 (hereafter, referred to as 'document No. 1'). In the method, reference patterns corresponding to all the phonemes, syllables, etc. of each speaker are previously registered on speaker registration, and a text which is specified by the speaker recognition device or by the user of the device is uttered by the unknown speaker on speaker identification (verification). The speaker verification is executed using a reference pattern which is generated by linking the reference patterns of phonemes/syllables together.

In the following, the method of the document No.1 will be described referring to FIG. 2. FIG. 2 is a block diagram showing functional blocks of another conventional speaker recognition device for executing the method of the document No. 1. The device of FIG. 2 comprises a text generation section 201, a display section 202, a voice input terminal 101, a voice analysis section 102, a speaker information input terminal 105, a speaker reference pattern storing section 103, a similarity calculation section 207, a judgment section 208, and an output terminal 209.

The text generation section 201 generates and specifies a text to be uttered by an unknown speaker. The text specified by the text generation section 201 is displayed on the display section 202. Then the unknown speaker utters the specified text, and a voice signal generated by a microphone etc. according to the utterance is supplied to the voice input terminal 101. The voice analysis section 102 executes sound analysis of the inputted voice signal and generates an input pattern which is composed of time sequences of feature values of the inputted voice signal.

Information for identifying a speaker such as speaker name, speaker ID, etc. is inputted by the unknown speaker and is supplied to the speaker information input terminal 105. In the speaker reference pattern storing section 103 of the speaker recognition device of FIG. 2, a plurality of reference patterns which represent acoustic features of phonemes/syllables spoken by registered speakers are stored. The similarity calculation section 207 identifies one registered speaker who corresponds to the information inputted to the speaker information input terminal 105, reads out reference patterns of the identified registered speaker from the speaker reference pattern storing section 103, generates a reference pattern which corresponds to the specified text by linking together the reference patterns of phonemes/syllables read out from the speaker reference pattern storing section 103, and calculates the degree of similarity between the linked reference pattern and the input pattern generated by the voice analysis section 102. The judgment section 208 compares the calculated degree of similarity with a predetermined threshold value, and judges that the unknown speaker is the identified registered speaker himself/herself if the degree of similarity is larger than the threshold value, and otherwise, judges that the unknown speaker is an impostor. The judgment is outputted to the output terminal 209.

According to the method of the document No. 1, it is possible to alter the text to be uttered on each speaker verification, thereby the aforementioned type of imposture (i.e. recording and playing back) becomes considerably difficult.

However, the method of the document No. 1 requires utterance of all the phonemes/syllables which are capable of generating any arbitrary text, on each speaker registration, and needs generation and storage of all the reference patterns corresponding to the uttered phonemes/syllables of all the registered speakers. Therefore, the method requires enormous tasks of the speakers to be registered and huge storage capacity of the speaker reference pattern storing section 103.

SUMMARY OF THE INVENTION

It is therefore the primary object of the present invention to provide a speaker recognition device by which imposture by voice recording can be effectively avoided, without heavy tasks of the speakers to be registered and without large storage capacity of the device.

In accordance with a first aspect of the present invention, there is provided a speaker recognition device for judging whether or not an unknown speaker is an authentic registered speaker himself/herself. The speaker recognition device instructs the unknown speaker to input an ID of the unknown speaker and utter a specified text designated by the speaker recognition device and a password of the unknown speaker, receives the input of the ID and the utterance of the specified text and the password from the unknown speaker, and judges that the unknown speaker is the authentic registered speaker himself/herself if the following conditions are satisfied:

a. text contents of the specified text uttered by the unknown speaker are the same as those of the specified text designated by the speaker recognition device; and b. the degree of similarity between acoustic features of the password uttered by the unknown speaker and acoustic features of the password uttered by the authentic registered speaker who corresponds to the inputted ID is larger than a predetermined threshold value.

In accordance with a second aspect of the present invention, there is provided a speaker recognition device for judging whether or not an unknown speaker is an authentic registered speaker himself/herself. The speaker recognition device instructs the unknown speaker to input an ID of the unknown speaker and utter a specified text designated by the speaker recognition device and a password of the unknown speaker, receives the input of the ID and the utterance of the specified text and the password from the unknown speaker, and judges that the unknown speaker is the authentic registered speaker himself/herself if the following conditions are satisfied:

a. text contents of the specified text uttered by the unknown speaker are the same as those of the specified text designated by the speaker recognition device;

b. the degree of similarity between acoustic features of the password uttered by the unknown speaker and acoustic features of the password uttered by the authentic registered speaker who corresponds to the inputted ID is larger than a predetermined threshold value; and c. the specified text and the password are judged to have been uttered by the same speaker.

In accordance with a third aspect of the present invention, there is provided a speaker recognition device for judging whether or not an unknown speaker is an authentic registered speaker himself/herself, comprising a text generation section, a presentation section, a voice input section, a speaker information input section, a speaker independent reference pattern storing section, a speaker reference pattern storing section, a voice analysis section, a time correspondence section, a text verification section, a similarity calculation section, and a judgment section. The text generation section generates a specified text to be uttered by an unknown speaker. The presentation section instructs the unknown speaker to utter the specified text together with a password of the unknown speaker. The voice input section receives the utterance of the specified text and the password of the unknown speaker. The speaker information input section receives an ID of a registered speaker which is inputted by the unknown speaker. The speaker independent reference pattern storing section stores speaker independent reference patterns which represent acoustic features of speaker independent phonemes/syllables etc. by which any arbitrary text can be generated. The speaker reference pattern storing section stores a plurality of speaker reference patterns each of which representing acoustic features of a password which has been uttered by each registered speaker. The voice analysis section executes sound analysis of voice waveform of the utterance of the unknown speaker and generates an input pattern by extracting feature values from the voice waveform. The time correspondence section links together the speaker independent phoneme/syllable reference patterns stored in the speaker independent reference pattern storing section and generates a reference pattern of the specified text and a reference pattern of a password of one registered speaker who corresponds to an ID which has been inputted to the speaker information input section by the unknown speaker, establishes time-correspondence between the two generated reference patterns and the input pattern generated by the voice analysis section, and segments the input pattern into a first input pattern corresponding to the specified text and a second input pattern corresponding to the password using the time-correspondence. The text verification section judges whether or not text contents of the first input pattern corresponding to the specified text are the same as text contents of the specified text generated by the text generation section. The similarity calculation section obtains the degree of similarity between a speaker reference pattern stored in the speaker reference pattern storing section which corresponds to the ID inputted by the unknown speaker and the second input pattern corresponding to the password. And the judgment section judges that the unknown speaker is the authentic registered speaker himself/herself if the following conditions are satisfied:

a. the result of the judgment by the text verification section is affirmative; and b. the degree of similarity calculated by the similarity calculation section is larger than a predetermined threshold value.

In accordance with a fourth aspect of the present invention, in the third aspect, the speaker recognition device further comprises a speaker identity verification section. The speaker identity verification section verifies speaker identity between the first input pattern corresponding to the specified text and the second input pattern corresponding to the password. Then, the judgment section judges that the unknown speaker is the authentic registered speaker himself/herself if the following conditions are satisfied:

a. the result of the judgment by the text verification section is affirmative;

b. the degree of similarity calculated by the similarity calculation section is larger than a predetermined threshold value; and c. the result of the speaker identity verification by the speaker identity verification section is affirmative.

In accordance with a fifth aspect of the present invention, in the third aspect, the text verification section obtains a first likelihood between the first input pattern and the reference pattern of the specified text and a second likelihood between the first input pattern and a reference pattern which can accept all possible phoneme sequence, and judges that the text contents of the first input pattern are the same as the text contents of the specified text generated by the text generation section if the difference between the first likelihood and the second likelihood is smaller than a threshold value.

In accordance with a sixth aspect of the present invention, in the fourth aspect, the text verification section obtains a first likelihood between the first input pattern and the reference pattern of the specified text and a second likelihood between the first input pattern and a reference pattern which can accept all possible phoneme sequence, and judges that the text contents of the first input pattern are the same as the text contents of the specified text generated by the text generation section if the difference between the first likelihood and the second likelihood is smaller than a threshold value.

In accordance with a seventh aspect of the present invention, in the fourth aspect, the speaker identity verification section calculates a text independent similarity between the first input pattern corresponding to the specified text and the second input pattern corresponding to the password, and judges that both the first input pattern and the second input pattern have been uttered by the same speaker if the calculated text independent similarity is larger than a predetermined threshold value.

In accordance with an eighth aspect of the present invention, in the fourth aspect, the speaker identity verification section obtains a first text independent similarity and a second text independent similarity with regard to each of a plurality of predetermined speakers. Here, the first text independent similarity is the degree of text independent similarity between the first input pattern and a speaker dependent reference pattern of one of the predetermined speakers which can accept all possible phoneme sequence, and the second similarity is the degree of text independent similarity between the second input pattern and the speaker dependent reference pattern of the one of the predetermined speakers which can accept all possible phoneme sequence. Then, the speaker identity verification section judges that both the first input pattern and the second input pattern have been uttered by the same speaker if a first group of speakers whose first text independent similarities are large and a second group of speakers whose second text independent similarities are large have similar composition of members.

In accordance with a ninth aspect of the present invention, in the fourth aspect, the speaker identity verification section executes speaker adaptation to speaker independent phoneme/syllable reference patterns using one of the first input pattern and the second input pattern, obtains a first similarity and a second similarity with regard to the other one of the first input pattern and the second input pattern. Here, the first similarity is the degree of similarity between the other one and the speaker independent phoneme/syllable reference patterns before the speaker adaptation, and the second similarity is the degree of similarity between the other one and the speaker independent phoneme/syllable reference patterns after the speaker adaptation. Then, the speaker identity verification section judges that both the first input pattern and the second input pattern have been uttered by the same speaker if the second similarity is larger than the first similarity by more than a predetermined threshold value.

In accordance with a tenth aspect of the present invention, in the third aspect, the speaker reference pattern storing section further stores text contents of each password which has been uttered by each registered speaker, and the time correspondence section utilizes the text contents for generating the reference pattern of the password which corresponds to the inputted ID.

In accordance with an eleventh aspect of the present invention, in the third aspect, the time correspondence section utilizes a speaker independent phoneme/syllable reference pattern which can accept all possible phoneme sequence for generating the reference pattern of the password which corresponds to the inputted ID.

In accordance with a twelfth aspect of the present invention, there is provided a speaker recognition device for judging whether or not an unknown speaker is an authentic registered speaker himself/herself, comprising a text generation section, a presentation section, a voice input section, a speaker information input section, a speaker independent reference pattern storing section, a speaker reference pattern storing section, a voice analysis section, a time correspondence section, a text verification section, a speaker adaptation section, a similarity calculation section, and a judgment section. The text generation section generates a specified text to be uttered by an unknown speaker. The presentation section instructs the unknown speaker to utter the specified text together with a password of the unknown speaker. The voice input section receives the utterance of the specified text and the password of the unknown speaker. The speaker information input section receives an ID of a registered speaker which is inputted by the unknown speaker. The speaker independent reference pattern storing section stores speaker independent reference patterns which represent acoustic features of speaker independent phonemes/syllables etc. by which any arbitrary text can be generated. The speaker reference pattern storing section stores a plurality of speaker reference patterns each of which representing acoustic features of a password which has been uttered by each registered speaker. The voice analysis section executes sound analysis of voice waveform of the utterance of the unknown speaker and generates an input pattern by extracting feature values from the voice waveform.

The time correspondence section links together the speaker independent phoneme/syllable reference patterns stored in the speaker independent reference pattern storing section and generates a reference pattern of the specified text and a reference pattern of a password of one registered speaker who corresponds to an ID which has been inputted to the speaker information input section by the unknown speaker, establishes time-correspondence between the two generated reference patterns and the input pattern generated by the voice analysis section, and segments the input pattern into a first input pattern corresponding to the specified text and a second input pattern corresponding to the password using the time-correspondence. The text verification section judges whether or not text contents of the first input pattern corresponding to the specified text are the same as text contents of the specified text generated by the text generation section. The speaker adaptation section executes speaker adaptation to a speaker reference pattern which corresponds to the inputted ID using the first input pattern corresponding to the specified text. The similarity calculation section obtains a first similarity before the speaker adaptation and a second similarity after the speaker adaptation. Here, the first similarity before the speaker adaptation is the degree of similarity between the speaker reference pattern before the speaker adaptation and the second input pattern corresponding to the password, and the second similarity after the speaker adaptation is the degree of similarity between the speaker reference pattern after the speaker adaptation and the second input pattern corresponding to the password. And the judgment section judges that the unknown speaker is the authentic registered speaker himself/herself if the following conditions are satisfied:

a. the result of the judgment by the text verification section is affirmative;

b. the first similarity before the speaker adaptation obtained by the similarity calculation section is larger then a predetermined threshold value; and c. the second similarity after the speaker adaptation obtained by the similarity calculation section is larger than the first similarity before the speaker adaptation by more than another predetermined threshold value.

In accordance with a thirteenth aspect of the present invention, in the twelfth aspect, the speaker recognition device further comprises a speaker identity verification section. The speaker identity verification section verifies speaker identity between the first input pattern corresponding to the specified text and the second input pattern corresponding to the password. Then, the judgment section judges that the unknown speaker is the authentic registered speaker himself/herself if the following conditions are satisfied:

a. the result of the judgment by the text verification section is affirmative;
b. the first similarity before the speaker adaptation obtained by the similarity calculation section is larger then a predetermined threshold value;
c. the second similarity after the speaker adaptation obtained by the similarity calculation section is larger than the first similarity before the speaker adaptation by more than another predetermined threshold value; and
d. the result of the speaker identity verification by the speaker identity verification section is affirmative.

In accordance with a fourteenth aspect of the present invention, in the twelfth aspect, the text verification section obtains a first likelihood between the first input pattern and the reference pattern of the specified text and a second likelihood between the first input pattern and a reference pattern which can accept all possible phoneme sequence, and judges that the text contents of the first input pattern are the same as the text contents of the specified text generated by the text generation section if the difference between the first likelihood and the second likelihood is smaller than a threshold value.

In accordance with a fifteenth aspect of the present invention, in the thirteenth aspect, the text verification section obtains a first likelihood between the first input pattern and the reference pattern of the specified text and a second likelihood between the first input pattern and a reference pattern which can accept all possible phoneme sequence, and judges that the text contents of the first input pattern are the same as the text contents of the specified text generated by the text generation section if the difference between the first likelihood and the second likelihood is smaller than a threshold value.

In accordance with a sixteenth aspect of the present invention, in the thirteenth aspect, the speaker identity verification section calculates a text independent similarity between the first input pattern corresponding to the specified text and the second input pattern corresponding to the password, and judges that both the first input pattern and the second input pattern have been uttered by the same speaker if the calculated text independent similarity is larger than a predetermined threshold value.

In accordance with a seventeenth aspect of the present invention, in the thirteenth aspect, the speaker identity verification section obtains a first text independent similarity and a second text independent similarity with regard to each of a plurality of predetermined speakers. Here, the first text independent similarity is the degree of text independent similarity between the first input pattern and a speaker dependent reference pattern of one of the predetermined speakers which can accept all possible phoneme sequence, and the second similarity is the degree of text independent similarity between the second input pattern and the speaker dependent reference pattern of the one of the predetermined speakers which can accept all possible phoneme sequence. Then, the speaker identity verification section judges that both the first input pattern and the second input pattern have been uttered by the same speaker if a first group of speakers whose first text independent similarities are large and a second group of speakers whose second text independent similarities are large have similar composition of members.

In accordance with an eighteenth aspect of the present invention, in the thirteenth aspect, the speaker identity verification section executes speaker adaptation to speaker independent phoneme/syllable reference patterns using one of the first input pattern and the second input pattern, obtains a first similarity and a second similarity with regard to the other one of the first input pattern and the second input pattern. Here, the first similarity is the degree of similarity between the other one and the speaker independent phoneme/syllable reference patterns before the speaker adaptation, and the second similarity is the degree of similarity between the other one and the speaker independent phoneme/syllable reference patterns after the speaker adaptation. Then, the speaker identity verification section judges that both the first input pattern and the second input pattern have been uttered by the same speaker if the second similarity is larger than the first similarity by more than a predetermined threshold value.

In accordance with a nineteenth aspect of the present invention, in the twelfth aspect, the speaker reference pattern storing section further stores text contents of each password which has been uttered by each registered speaker, and the time correspondence section utilizes the text contents for generating the reference pattern of the password which corresponds to the inputted ID.

In accordance with a twentieth aspect of the present invention, in the twelfth aspect, the time correspondence section utilizes a speaker independent phoneme/syllable reference pattern which can accept all possible phoneme sequence for generating the reference pattern of the password which corresponds to the inputted ID.

BRIEF DESCRIPTION OF THE DRAWINGS

The objects and features of the present invention will become more apparent from the consideration of the following detailed description taken in conjunction with the accompanying drawings in which:

FIG. 7 is a block diagram showing functional blocks of a speaker recognition device according to the third embodiment of the present invention; and FIG. 8 is a block diagram showing functional blocks of a speaker recognition device according to the fourth embodiment of the present invention.

DESCRIPTION OF THE PREFERRED EMBODIMENTS

Figure 1:
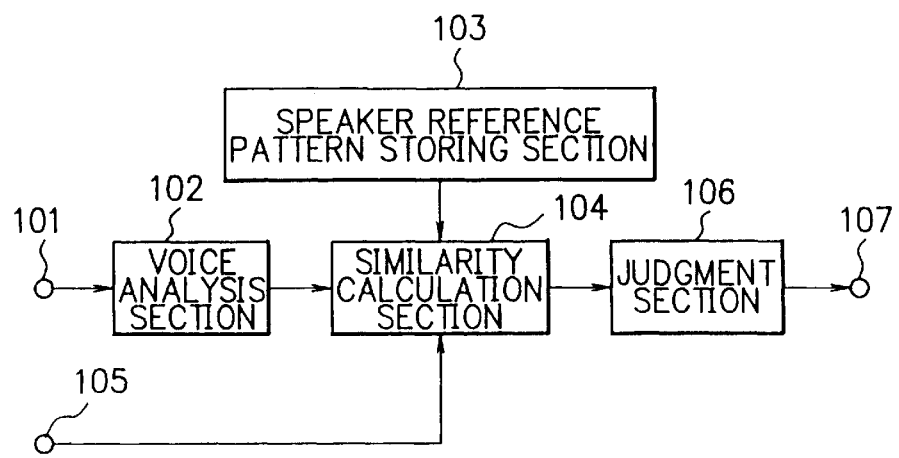
FIG. 1 is a block diagram showing functional blocks of a conventional speaker recognition device.
Figure 2:
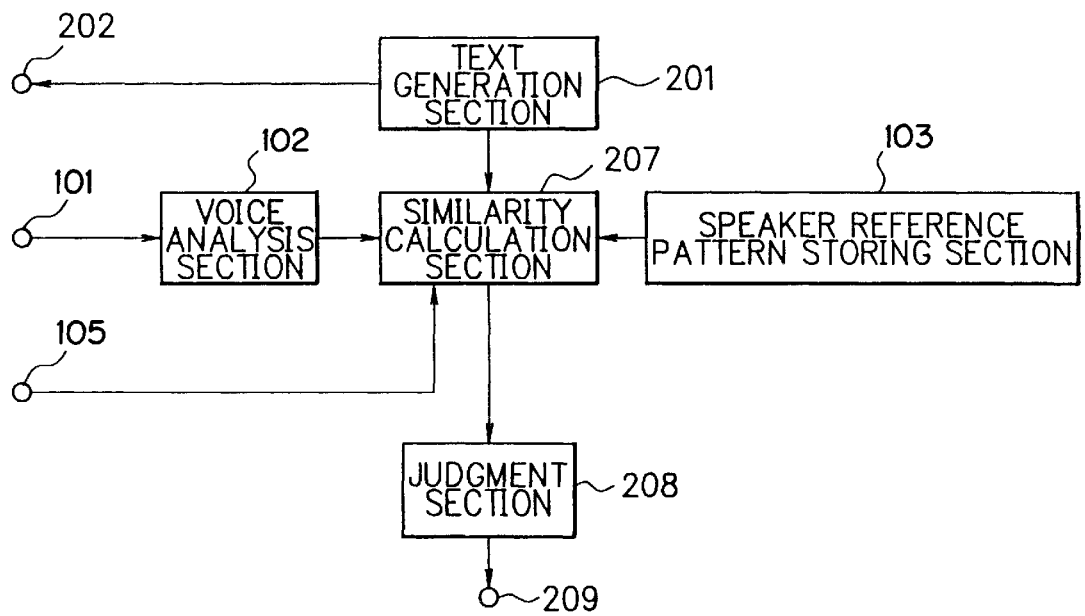
FIG. 2 is a block diagram showing functional blocks of another conventional speaker recognition device.

Referring now to the drawings, a description will be given in detail of preferred embodiments in accordance with the present invention.

First, an outline of the speaker recognition device according to the present invention will be explained.

The speaker recognition device according to the present invention judges whether or not an unknown speaker is a genuine registered speaker (i.e. a customer), by instructing the unknown speaker to utter at least two kinds of things: a 'specified text' and a 'password'. The specified text is specified by the speaker recognition device or by the user of the device, and the password is decided by each speaker to be registered on speaker registration. The speaker recognition device inputs the specified text and the password uttered by the unknown speaker and an ID inputted by the unknown speaker, and judges whether or not the unknown speaker is an authentic registered speaker, using the text contents of the specified text uttered by the unknown speaker and acoustic features of the password uttered by the unknown speaker. The unknown speaker is judged to be the authentic registered speaker if the text contents of the specified text uttered by the unknown speaker is the same as that of the specified text instructed by the speaker recognition device and the degree of similarity between the acoustic features of the password uttered by the unknown speaker and the acoustic features of the password uttered by the authentic registered speaker who corresponds to the inputted ID is larger than a predetermined threshold value.

As mentioned above, the speaker recognition device according to the present invention realizes avoidance of the imposture by voice recording with easy speaker registration and small storage capacity of the device, by combining two types of verification together, i.e. 'text verification using speaker independent speech recognition' and 'speaker verification by comparison with a reference pattern of a password of a registered speaker'.

For the text verification using speaker independent speech recognition, a document: T. Watanabe et al. "Unknown utterance rejection using likelihood normalization based on syllable recognition", The Transactions of the Institute of Electronics, Information and Communication Engineers, vol. J75-D-II, No. 12, pages 2002–2009 (December 1992) (hereafter, referred to as 'document No. 2') is known. According to the document No. 2, inputted speech which ought not to be recognized as a word or a phrase (i.e., out of vocabulary words) can be rejected accurately by using two likelihoods. The first likelihood is a likelihood between an inputted speech input pattern of the inputted speech) and a reference pattern of a word (or a phrase) to be recognized. The second likelihood is a likelihood between the inputted speech (the input pattern of the inputted speech) and a reference pattern which can accept all possible phoneme sequence. The inputted speech is rejected as it ought not to be recognized if the difference between the first likelihood and the second likelihood is larger than a threshold value.

Therefore, it is possible to avoid the imposture by voice recording, by instructing the unknown speaker to utter the specified text and the password, and executing the aforementioned 'text verification' using the utterance of the specified text and executing the aforementioned 'speaker verification' using the utterance of the password. According to the present invention, as for the phoneme/syllable reference patterns, a set of speaker independent phoneme/syllable reference patterns only is needed to be stored by the speaker recognition device. The speaker independent reference patterns are reference patterns which represent acoustic features of speaker independent phonemes/syllables.

For example, the speaker recognition device may instruct the unknown speaker to utter a specified text and a password by displaying "Please say the date of today 'December the twenty-fifth' and your password in series".

Then, the speaker recognition device links together the speaker independent phoneme/syllable reference patterns and generates a reference pattern of the date of the day ("December the twenty-fifth") and a reference pattern of a password of a registered speaker (customer) who corresponds to an ID which has been inputted by the unknown speaker, establishes time-correspondence between the two generated reference patterns and an input pattern (which is composed of a time sequence of feature vectors or time sequences of feature values) of the utterance by the unknown speaker by means of dynamic programming method, and segments the input pattern of the unknown speaker into two parts (i.e. a first input pattern corresponding to the date ("December the twenty-fifth") and a second input pattern corresponding to the password) using the time-correspondence. The above establishment of the time-correspondence by means of dynamic programming method can be executed, for example, according to a method which is disclosed in a document: H. Sakoe et al. "Recognition of continuously spoken words based on time-normalization by dynamic programming", The Journal of the Acoustical Society of Japan, vol. 27, No. 9, pages 483–490 (1971) (hereafter, referred to as 'document No. 3').

Figure 3:
FIG. 3 is a schematic diagram showing an example of a reference pattern generated by the speaker recognition device according to the present invention.
Figure 4:
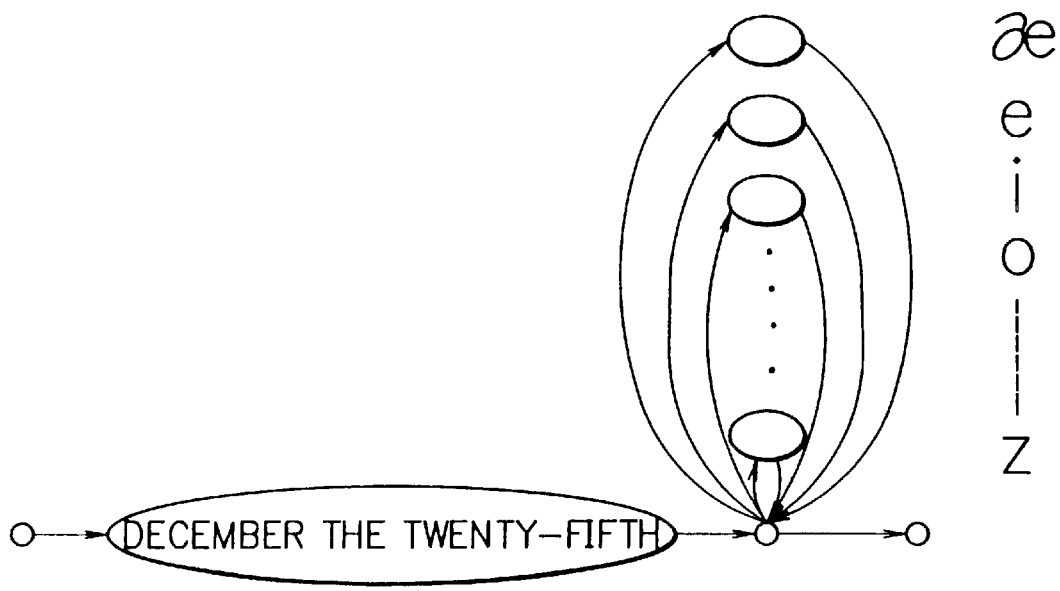
FIG. 4 is a schematic diagram showing a speaker independent phoneme/syllable reference pattern which can accept all possible phoneme sequence.

As for the aforementioned reference pattern of the password, in the case where text contents of the password have been previously registered, the reference pattern of the password can be generated by linking together the speaker independent phoneme/syllable reference patterns according the text contents of the password. For example, if the date of the day is 'December 25 (December the twenty-fifth)' and the password of a registered speaker corresponding to the inputted ID is 'Open sesame', a reference pattern shown in FIG. 3 is generated by the speaker recognition device in order to receive such a sequence of words. The aforementioned registration of the text contents of the password can generally be done in the form of pronunciation (i.e. by phonetic symbols etc.). However, it is also possible to generate a sequence of speaker independent phoneme/syllable reference patterns corresponding to the password on each speaker registration, by establishing time-correspondence between the password uttered by the speaker to be registered and the speaker independent phoneme/syllable reference pattern which can accept all possible phoneme sequence as shown in FIG. 4. In such a case, the generated sequence of phonemes/syllables can be registered as the text contents of the password. By using the reference pattern of the password prepared by such methods and the reference pattern of the specified text, the input pattern of the utterance by the unknown speaker is segmented into the aforementioned two parts.

Meanwhile in the case where the text contents of the password have not been previously registered and only an input pattern of the password has been registered, the speaker independent phoneme/syllable reference pattern which can accept all possible phoneme sequence as shown in FIG. 4 is used similarly to the above case, and the input pattern of the utterance by the unknown speaker is segmented into the aforementioned two parts.

Subsequently, the 'text verification' using the first input pattern corresponding to the specified text ("December the twenty-fifth") is executed. The text verification can be executed, for example, according to the method of the document No. 2, in which two likelihoods, the first likelihood between the first input pattern corresponding to the specified text and the reference pattern of the specified text and the second likelihood between the first input pattern corresponding to the specified text and the reference pattern which can accept all possible phoneme sequence, are used. It is judged that the specified text ("December the twenty-fifth") has been correctly uttered by the unknown speaker if the difference between the first likelihood and the second likelihood is smaller than a threshold value.

Subsequently, the 'speaker verification' using the second input pattern corresponding to the password is executed. It is judged that right password has been uttered by the authentic registered speaker who corresponds to the inputted ID, if the degree of similarity between the second input pattern corresponding to the password and a (speaker dependent) reference pattern of a password of a registered speaker who corresponds to the inputted ID is larger than a predetermined threshold value.

Then, it is judged that the unknown speaker is the authentic registered speaker himself/herself corresponding the inputted ID if both of the results of the 'text verification' and the speaker verification are affirmative, and otherwise, it is judged that the unknown speaker is an impostor.

By the aforementioned way according to the present invention, in order to register one speaker, a reference pattern which represents acoustic features of the password of the speaker is only needed to be registered, and thus the phoneme/syllable reference patterns of each speaker are not necessary. Therefore, it is possible to realize a speaker recognition device which is required considerably smaller storage capacity than the method of the document No.1 in which reference patterns representing acoustic features of all the phonemes/syllables of all the registered speakers are needed to be prepared. For example, in the case of Japanese language, the number of possible syllables in Japanese is more than 100, and the number of syllables in a password "Hi-ra-ke go-ma ('Open sesame' in Japanese)" is only 5. Therefore, in the case where recognition is executed by units of syllables, the amount of the acoustic features needed to be stored becomes less than 5/100 in comparison with the method of the document No. 1. Needless to say, the amount of acoustic features to be stored is also considerably reduced in cases of other languages according to the present invention.

Further, speakers to be registered are not required to execute huge amount of utterance corresponding to all the phonemes/syllables, that is, the tasks of speakers (customers) on speaker registration can be considerably reduced.

As shown above, it is possible according to one aspect of the present invention to avoid simple type imposture in which simple voice recording and playback are used. However, vicious impostors may try to execute utterance for the specified text on the spot, and then try to play back a previously recorded and edited password of a registered speaker. In order to handle such impostors, extra judgment, whether or not both the specified text and the password have been uttered by the same person, is needed.

For the extra judgment, speaker verification between the first input pattern corresponding the specified text and the second input pattern corresponding to the password may be executed, for example.

Generally, text contents of a specified text are different from those of a password, therefore, 'speaker verification independent of text contents' is needed to be executed in this case. For the text independent speaker verification, various kinds of known methods can be used. For example, a method based on vector quantization which is used in a document: A. E. Rosenberg and F. K. Soong, "Evaluation of a vector quantization talker recognition system in text independent and text dependent modes", Proc. of ICASSP 86, pages 873–876 (1986) (hereafter, referred to as 'document No. 4'), or a method based on hidden Markov model which is used in a document: Douglas A. Reynolds, "The effects of handset variability on speaker recognition performance: Experiments on the switchboard corpus", Proc. of ICASSP 96, pages 113–116 (1996) (hereafter, referred to as 'document No. 5') can be used.

The text independent speaker verification using no information about text contents is generally more difficult than text dependent speaker verification. However, in the case of the aforementioned extra judgment, voices which are uttered (or played back) at the same occasion and in the same environment can be used for speaker verification, and thus the speaker verification can be executed accurately enough by means of the text independent speaker verification.

As another method for the extra judgment (i.e. judging whether or not both the specified text and the password have been uttered by the same person), it is possible to execute the aforementioned 'text independent speaker verification' between the first input pattern corresponding to the specified text and a plurality of predetermined speakers, and between the second input pattern corresponding to the password and the same predetermined speakers. If both of the first input pattern and the second input pattern have been uttered by the same person, a first group of speakers that are similar to the first input pattern according to the text independent speaker verification and a second group of speakers that are similar to the second input pattern according to the text independent speaker verification should have similar composition of members. Therefore, the extra judgment by means of the 'text independent speaker verification' can be executed by obtaining two (text independent) similarities with regard to each of the predetermined speakers. Here, the first similarity is the degree of similarity between the first input pattern corresponding to the specified text and a (speaker dependent) reference pattern of one of the predetermined speakers which can accept all possible phoneme sequence, and the second similarity is the degree of similarity between the second input pattern corresponding to the password and the (speaker dependent) reference pattern of the one of the predetermined speakers which can accept all possible phoneme sequence. In this method, it may be judged that both the specified text and the password have been uttered by the same person, if a speaker who is most similar to the first input pattern is identical with a speaker who is most similar to the second input pattern, or if the most similar five speakers to the first input pattern (a first group) and the most similar five speakers to the second input pattern (a second group) include more than three common members, etc. Further, it is also possible to apply a threshold value to the similarities, that is, it may be judged that both the specified text and the password have been uttered by the same person, if speakers whose degrees of similarity to the first input pattern are larger than the threshold value are included in both the above-mentioned first group and the second group, etc.

As one other method for the extra judgment (whether or not both the specified text and the password have been uttered by the same person), the following method can be used.

First, the speaker independent phoneme/syllable reference patterns are speaker-adapted, using the first input pattern corresponding to the specified text. Subsequently, two similarities are obtained with regard to the second input pattern corresponding to the password, i.e. a first similarity between the second input pattern corresponding to the password and the speaker independent phoneme/syllable reference patterns before the speaker adaptation, and a second similarity between the second input pattern corresponding to the password and the speaker independent phoneme/syllable reference patterns after the speaker adaptation. Then, it is judged that both the specified text and the password have been uttered by the same person, if the second similarity (after the speaker adaptation) is larger than the first similarity (before the speaker adaptation). Generally, in the case where both the specified text and the password have been uttered by the same person and the speaker independent phoneme/syllable reference patterns are speaker-adapted using one of the first input pattern and the second input pattern, a similarity between the other one (of the first input pattern and the second input pattern) and the speaker independent phoneme/syllable reference patterns is increased according to the speaker adaptation. The aforementioned method is based on such a principle. Therefore, of course, it is also possible to execute speaker adaptation of the speaker independent phoneme/syllable reference patterns using the second input pattern corresponding to the password, and execute the judgment by means of comparison between two similarities with regard to the first input pattern corresponding to the specified text. Generally, the speaker adaptation of the speaker independent phoneme/syllable reference patterns can be executed more effectively if text contents of the first input pattern or the second input pattern to be used for the speaker adaptation is known. Therefore, the first input pattern corresponding to the specified text is the most usable for the speaker adaptation, and the second input pattern corresponding to the password is also usable if text contents thereof is known. When a password whose text contents are not known is used for the speaker adaptation, the text contents can be obtained by means of text recognition using the aforementioned reference pattern which can accept all possible phoneme sequence. Various kinds of methods are used for the speaker adaptation and the following document is known for example: K. Shinoda, K. Iso, and T. Watanabe, "Speaker adaptation for demi-syllable based speech recognition using HMM", Proceedings of the Autumn Meeting of the Acoustical Society of Japan, pages 23–24 (September 1990) (hereafter, referred to as 'document No. 6').

Although speaker identity between the first input pattern and the second input pattern was directly verified in the above three methods for the extra judgment, the following method is also usable for indirect speaker identity verification between the first input pattern and the second input pattern. First, a reference pattern of a password of a registered speaker who corresponds to the inputted ID is speaker-adapted using the first input pattern corresponding to the specified text. Then, the reference pattern of the password after the speaker adaptation is used for verification of the speaker identity between the first input pattern and the second input pattern. In this case, by the speaker adaptation, speaker individuality included in the reference pattern of the password becomes speaker individuality of the speaker who uttered the specified text, and thus the similarity between the reference pattern of the password and the second input pattern becomes higher by the speaker, adaptation if both the specified text and the password have been uttered by the same speaker. Here, the speaker individuality of the registered speaker in the reference pattern of the password disappears by the speaker adaptation.

Therefore, two similarities, i.e. a first similarity before the speaker adaptation and a second similarity after the speaker adaptation are obtained. The first similarity before the speaker adaptation is the degree of similarity between the reference pattern of the password before the speaker adaptation and the second input pattern corresponding to the password, and the second similarity after the speaker adaptation is the degree of similarity between the reference pattern of the password after the speaker adaptation and the second input pattern corresponding to the password. Then, it is judged that both the first input pattern and the second input pattern have been uttered by the same speaker if the first similarity before the speaker adaptation is larger then a predetermined threshold value, and the second similarity after the speaker adaptation is larger than the first similarity before the speaker adaptation by more than another predetermined threshold value. The speaker adaptation in this method can also be done according to the document No.6 for example. Incidentally, of course it is as well possible to use both the direct speaker identity verification and the indirect speaker identity verification using the speaker adaptation.

In the following, preferred embodiments in accordance with the present invention will be described concretely.

Figure 5:
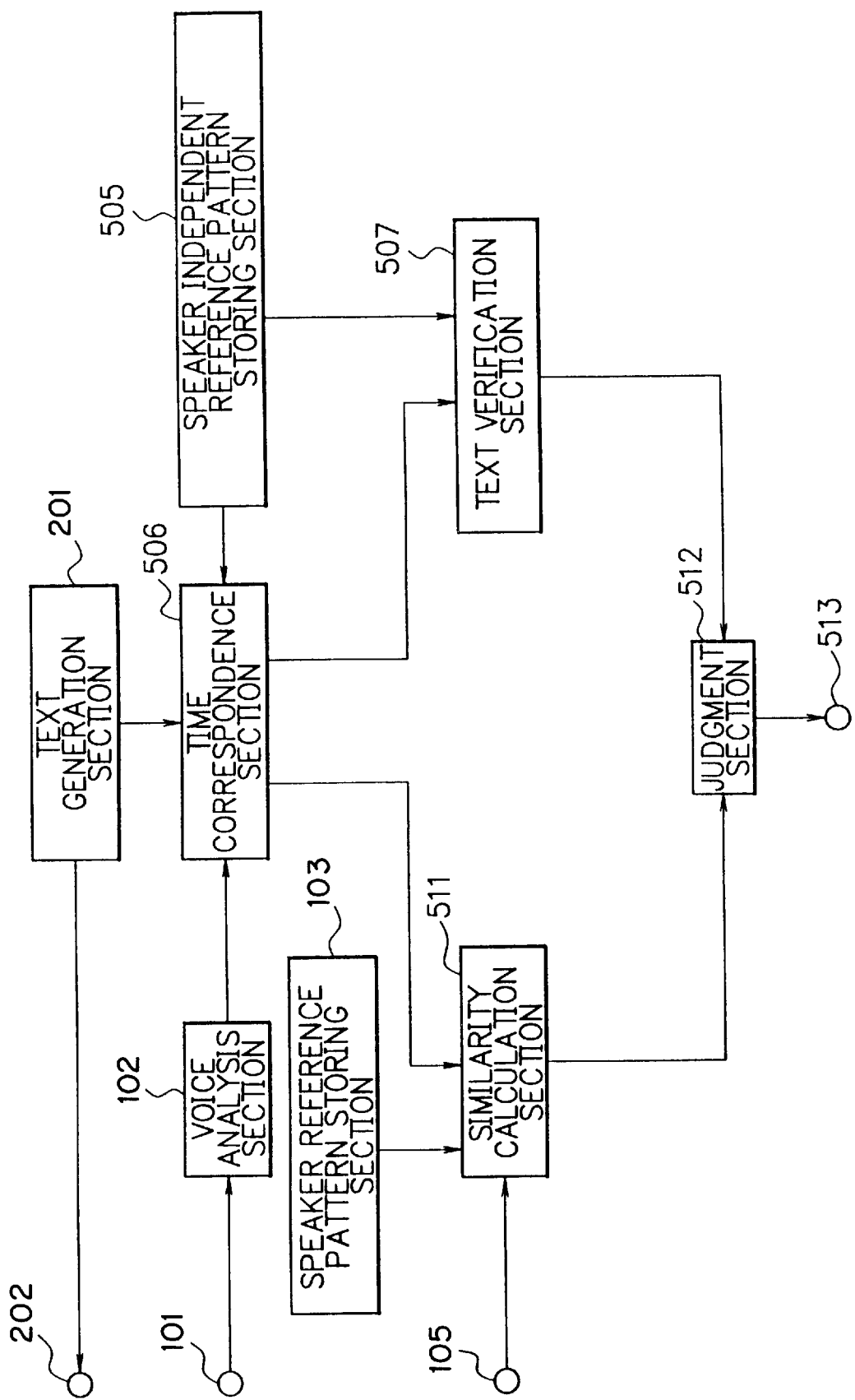
FIG. 5 is a block diagram showing functional blocks of a speaker recognition device according to the first embodiment of the present invention.

FIG. 5 is a block diagram showing functional blocks of a speaker recognition device according to the first embodiment of the present invention. The device of FIG. 5 comprises a text generation section 201, a presentation section 202, a voice input terminal 101, a voice analysis section 102, a speaker independent reference pattern storing section 505, a time correspondence section 506, a text verification section 507, a speaker information input section 105, a speaker reference pattern storing section 103, a similarity calculation section 51 1, a judgment section 512, and an output terminal 513.

The text generation section 201, the voice analysis section 102, time correspondence section 506, the text verification section 507, the similarity calculation section 511, and the judgment section 512 are realized by, for example, a microprocessor unit which is composed of a CPU, ROM (Read Only Memory), RAM (Random Access Memory), etc., and necessary software. The presentation section 202 is realized by a speaker, a display unit such as an LCD (Liquid Crystal Display), etc. The speaker independent reference pattern storing section 505 and the speaker reference pattern storing section 103 are realized by, for example, one or more storage devices such as an HDD (Hard Disk Drive), an MO (Magneto-Optical disk), etc. The speaker information input section 105 is realized by, for example, a keyboard, a display console, an LCD display switch, etc.

In the following, the operation of the speaker recognition device of FIG. 5 will be described.

The text generation section 201 generates a specified text to be uttered by an unknown speaker together with a password. The specified text generated by the text generation section 201 is presented to the unknown speaker by means of sound, image, etc. by the presentation section 202, and the unknown speaker is instructed to input an ID and utter the specified text and the password in series. Here, the ID may be one of a speaker name, a speaker number, a speaker code, etc. that can specify one registered speaker (customer). Then the unknown speaker inputs the ID by operating the speaker information input section 105 and utters the specified text and the password according to the instruction. Voice data picked up by a microphone etc. according to the utterance of the specified text and the password is supplied to the voice input terminal 101. The voice analysis section 102 executes sound analysis of the inputted voice data at intervals of 11 ms for example, and converts the data into an input pattern (i.e. a time sequence of feature vectors which represent acoustic features of the voice data). Here, the feature vector may include voice power for example. As elements of the feature vector, cepstrum coefficients, LPC coefficients, variations of them, etc., which can be obtained by means of FFT (Fast Fourier Transform) analysis, linear predictive analysis, etc. can be used, as mentioned in a document: Sadaoki Furui "Digital voice processing", Tokai Daigaku Shuppankai, Japan (1985) (hereafter, referred to as 'document No. 7').

In the speaker independent reference pattern storing section 505, speaker independent reference patterns which represent acoustic features of speaker independent phonemes/syllables etc. are stored. The time correspondence section 506 links together the speaker independent phoneme/syllable reference patterns to generate a reference pattern of the specified text and a reference pattern of a password of one registered speaker who corresponds to the ID which has been inputted by the unknown speaker, establishes time-correspondence between the two generated reference patterns and the input pattern of the utterance by the unknown speaker by means of dynamic programming method (for example, according to the document No. 3), and segments the input pattern of the unknown speaker into two parts (i.e. a first input pattern corresponding to the specified text and a second input pattern corresponding to the password) using the time-correspondence. Subsequently, the text verification section 507 executes the 'text verification' of the first input pattern according to the method of the document No. 2, for example. According to the method of the document No. 2, he text verification section 507 obtains the aforementioned two likelihoods, i.e. the first likelihood between the first input pattern and the reference pattern of the specified text and the second likelihood between the first input pattern and the reference pattern which can accept all possible phoneme sequence, and judges that the specified text (for example, "December the twenty-fifth") has been correctly uttered by the unknown speaker if the difference between the first likelihood and the second likelihood is smaller than a threshold value.

In the speaker reference pattern storing section 103, a plurality of (speaker) reference patterns each of which representing acoustic features of a password which has been uttered by each registered speaker, are stored. The similarity calculation section 511 identifies one registered speaker who corresponds to the ID which has been inputted by the unknown speaker, reads out a reference pattern which represents acoustic features of a password of the identified registered speaker from the speaker reference pattern storing section 103, and calculates the degree of similarity between the reference pattern read out from the speaker reference pattern storing section 103 and the second input pattern corresponding to the password, according to the method of the document No. 3, for example.

The judgment section 512 judges that the unknown speaker is the identified registered speaker himself/herself if the result of the judgment by the text verification section 507 (i.e. the text verification) is affirmative and the degree of similarity calculated by the similarity calculation section 511 is larger than a predetermined threshold value, and otherwise, judges that the unknown speaker is an impostor. The judgment is outputted to the output terminal 513.

As described above, according to the first embodiment, imposture by voice recording can be effectively avoided by means of the 'text verification using speaker independent speech recognition' and the 'speaker verification by comparison with a reference pattern of a password of a registered speaker'. The 'text verification' is executed using a set of speaker independent reference patterns representing acoustic features of speaker independent phonemes/syllables which is stored in the speaker independent reference pattern storing section 505, and the 'speaker verification' is executed using the reference patterns representing acoustic features of passwords of registered speakers which are stored in the speaker reference pattern storing section 103. Therefore, storage capacity for storing reference patterns for verification can be considerably reduced in comparison with the conventional method of the document No.1 in which reference patterns representing acoustic features of all the phonemes/syllables of all the registered speakers are needed to be prepared. Further, according to the first embodiment, speakers to be registered are not required to execute huge amount of utterance corresponding to all the phonemes/syllables etc., thereby the tasks of speakers (customers) on speaker registration can be considerably reduced.

Figure 6:
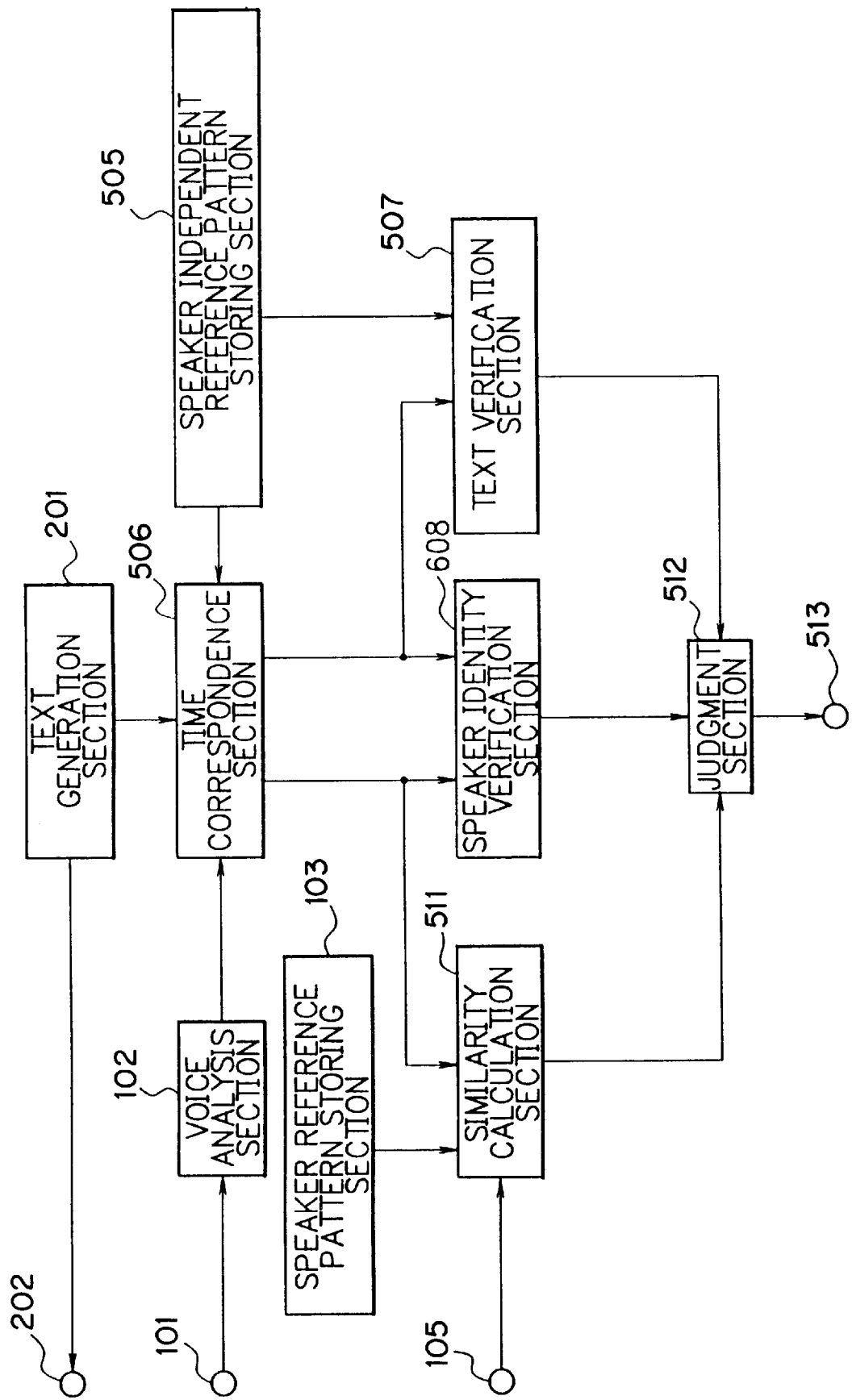
FIG. 6 is a block diagram showing functional blocks of a speaker recognition device according to the second embodiment of the present invention.

FIG. 6 is a block diagram showing functional blocks of a speaker recognition device according to the second embodiment of the present invention. The device of FIG. 6 comprises a text generation section 201, a presentation section 202, a voice input terminal 101, a voice analysis section 102, a speaker independent reference pattern storing section 505, a time correspondence section 506, a text verification section 507, a speaker information input section 105, a reference pattern storing section 103, a similarity calculation section 511, a judgment section 512, and an output terminal 513, similarly to the speaker recognition device of FIG. 5. The blocks 201–513 (excluding 608) in FIG. 6 correspond to the blocks 201–513 (excluding 508) in FIG. 5, respectively. The speaker recognition device of FIG. 6 further comprises a speaker identity verification section 608 for executing the aforementioned 'extra judgment' (i.e. the speaker identity verification between the first input pattern and the second input pattern).

In the following, the operation of the speaker recognition device of FIG. 6 will be described. Operations of the blocks except for the speaker identity verification section 608 and the judgment section 512 are the same as operations of corresponding blocks in the first embodiment of FIG. 5, and thus repeated description thereof is omitted for brevity.

The speaker identity verification section 608 executes the speaker identity verification according to the method of the document No. 4 or the document No. 5, for example. According to the document No. 4 or No. 5, the speaker identity verification section 608 executes text independent speaker verification between the first input pattern corresponding the specified text and the second input pattern corresponding to the password. More concretely, the speaker identity verification section 608 calculates a text independent similarity between the first input pattern and the second input pattern, and judges that the first input pattern and the second input pattern have been uttered by the same speaker if the calculated text independent similarity is larger than a predetermined threshold value.

The judgment section 512 of the second embodiment judges that the unknown speaker is the registered speaker himself/herself corresponding to the inputted ID if the following three conditions are satisfied:

a. the result of the text verification by the text verification section 507 is affirmative;

b. the degree of similarity calculated by the similarity calculation section 511 is larger than a predetermined threshold value; and c. the result of the speaker identity verification by the speaker identity verification section 608 is affirmative.

And otherwise, the judgment section 512 judges that the unknown speaker is an impostor. The judgment is outputted to the output terminal 513.

Incidentally, the speaker identity verification section 608 can execute the speaker identity verification using the aforementioned 'another' method. According to the method, the speaker identity verification section 608 executes the 'text independent speaker verification' according to the document No. 4 or No. 5, between the first input pattern and a plurality of predetermined speakers, and between the second input pattern and the same predetermined speakers. Then, the speaker identity verification section 608 judges that both the first input pattern corresponding to the specified text and the second input pattern corresponding to the password have been uttered by the same speaker, if a first group of speakers that are similar to the first input pattern according to the text independent speaker verification and a second group of speakers that are similar to the second input pattern according to the text independent speaker verification have similar composition of members. Concrete procedures for this method have been described in the above paragraph for 'another method for the extra judgment', and thus repeated description thereof is omitted here.

Further, the aforementioned 'one other' method can be used by the speaker identity verification section 608. According to the method, the speaker identity verification section 608 executes speaker adaptation to the speaker independent phoneme/syllable reference patterns by the speaker adaptation method shown in the document No.6 for example, using the first input pattern corresponding to the specified text. Subsequently, the speaker identity verification section 608 obtains two similarities with regard to the second input pattern corresponding to the password, i.e. the first similarity between the second input pattern and the speaker independent phoneme/syllable reference patterns before the speaker adaptation, and the second similarity between the second input pattern and the speaker independent phoneme/syllable reference patterns after the speaker adaptation. Then, the speaker identity verification section 608 judges that both the first input pattern corresponding to the specified text and the second input pattern corresponding to the password have been uttered by the same speaker, if the similarity has been improved by the speaker adaptation by more than a predetermined threshold value.

As described above, according to the second embodiment, as the same effects as those of the first embodiment, the vicious kind of imposture (by uttering the specified text on the spot and playing back a previously recorded and edited password of a registered speaker) can be avoided by executing the speaker identity verification between the first input pattern corresponding to the specified text and the second input pattern corresponding to the password by the speaker identity verification section 608.

FIG. 7 is a block diagram showing functional blocks of a speaker recognition device according to the third embodiment of the present invention. The device of FIG. 7 comprises a text generation section 201, a presentation section 202, a voice input terminal 101, a voice analysis section 102, a speaker independent reference pattern storing section 505, a time correspondence section 506, a text verification section 507, a speaker information input section 105, a speaker reference pattern storing section 103, a similarity calculation section 511, a judgment section 512, and an output terminal 513, similarly to the speaker recognition device of FIG. 5. The blocks 201–513 in FIG. 7 correspond to the blocks 201–513 in FIG. 5, respectively. The speaker recognition device of FIG. 7 further comprises a speaker adaptation section 714 for executing speaker adaptation to a speaker reference pattern (stored in the speaker reference pattern storing section 103) which corresponds to the inputted ID using the first input pattern corresponding to the specified text. The third embodiment utilizes the speaker adaptation for the speaker verification.

In the following, the operation of the speaker recognition device of FIG. 7 will be described.

The text generation section 201 generates a specified text to be uttered by an unknown speaker together with a password. The specified text is presented to the unknown speaker by means of sound, image, etc. by the presentation section 202 and the unknown speaker is instructed to input an ID and utter the specified text and the password in series. Then the unknown speaker inputs the ID operating the speaker information input section 105 and utters the specified text and the password. Voice data picked up by a microphone etc. according to the utterance of the specified text and the password is supplied to the voice input terminal 101. The voice analysis section 102 executes sound analysis of the inputted voice data at intervals of 15 ms for example, and converts the data into an input pattern (i.e. a time sequence of feature vectors which represent acoustic features of the voice data). Here, the feature vector may include voice power for example. As elements of the feature vector, cepstrum coefficients, LPC coefficients, variations of them, etc., which can be obtained by means of FFT analysis, linear predictive analysis, etc. can be used, as mentioned in the document No.7.

In the speaker independent reference pattern storing section 505, speaker independent reference patterns which represent acoustic features of speaker independent phonemes/syllables etc. are stored. The time correspondence section 506 links together the speaker independent phoneme/syllable reference patterns to generate a reference pattern of the specified text and a reference pattern of a password of one registered speaker who corresponds to the ID which has been inputted by the unknown speaker, establishes time-correspondence between the two generated reference patterns and the input pattern of the utterance by the unknown speaker by means of dynamic programming method (for example, according to the document No.3), and segments the input pattern of the unknown speaker into two parts (i.e. the first input pattern corresponding to the specified text and the second input pattern corresponding to the password) using the time-correspondence. Subsequently, the text verification section 507 executes the 'text verification' of the first input pattern, for example, according to the method of the document No.2, in which the text verification section 507 obtains the aforementioned two likelihoods, i.e. the first likelihood between the first input pattern and the reference pattern of the specified text and the second likelihood between the first input pattern and the reference pattern which can accept all possible phoneme sequence, and judges that the specified text has been correctly uttered by the unknown speaker if the difference between the first likelihood and the second likelihood is smaller than a threshold value.

In the speaker reference pattern storing section 103, a plurality of (speaker) reference patterns each of which representing acoustic features of a password which has been uttered by each registered speaker, are stored. The speaker adaptation section 714 executes speaker adaptation to a speaker reference pattern of a password of a registered speaker who corresponds to the inputted ID, using the first input pattern corresponding to the specified text, according to the method shown in the document No.6 for example.

Subsequently, the similarity calculation section 511 of the third embodiment obtains two similarities, i.e. the first similarity before the speaker adaptation by speaker adaptation section 714 and the second similarity after the speaker adaptation by speaker adaptation section 714. Here, the first similarity before the speaker adaptation is the degree of similarity between the reference pattern of the password before the speaker adaptation and the second input pattern corresponding to the password, and the second similarity after the speaker adaptation is the degree of similarity between the reference pattern of the password after the speaker adaptation and the second input pattern corresponding to the password.

Then, the judgment section 512 of the third embodiment judges that the unknown speaker is the registered speaker himself/herself corresponding to the inputted ID if the following three conditions are satisfied:

a. the result of the text verification by the text verification section 507 is affirmative;

b. the first similarity before the speaker adaptation obtained by the similarity calculation section 511 is larger than a predetermined threshold value; and c. the second similarity after the speaker adaptation obtained by the similarity calculation section 511 is larger than the first similarity before the speaker adaptation by more than another predetermined threshold value.

And otherwise, the judgment section 512 judges that the unknown speaker is an impostor. The judgment is outputted to the output terminal 513.

As described above, according to the third embodiment, as the same effects as those of the first embodiment, the speaker identity verification between the first input pattern and the second input pattern can be executed indirectly by the speaker adaptation section 714, the similarity calculation section 511 and the judgment section 512, thereby the vicious kind of imposture (by uttering the specified text on the spot and playing back a previously recorded and edited password of a registered speaker) can be avoided, using other method than that of the second embodiment.

FIG. 8 is a block diagram showing functional blocks of a speaker recognition device according to the fourth embodiment of the present invention. The device of FIG. 8 comprises a text generation section 201, a presentation section 202, a voice input terminal 101, a voice analysis section 102, a speaker independent reference pattern storing section 505, a time correspondence section 506, a text verification section 507, a speaker information input section 105, a speaker reference pattern storing section 103, a similarity calculation section 511, a judgment section 512, an output terminal 513, and a speaker adaptation section 714, similarly to the speaker recognition device of the third embodiment of FIG. 7. The blocks 201–714 (excluding 808) in FIG. 8 correspond to the blocks 201–714 (excluding 708) in FIG. 7, respectively. The speaker recognition device of FIG. 8 further comprises a speaker identity verification section 808 for executing the speaker identity verification between the first input pattern and the second input pattern.

In the following, the operation of the speaker recognition device of FIG. 8 will be described.

The text generation section 201 generates a specified text to be uttered by an unknown speaker together with a password. The specified text is presented to the unknown speaker by means of sound, image, etc. by the presentation section 202 and the unknown speaker is instructed to input an ID and utter the specified text and the password in series. Then the unknown speaker inputs the ID operating the speaker information input section 105 and utters the specified text and the password. Voice data picked up by a microphone etc. according to the utterance of the specified text and the password is supplied to the voice input terminal 101. The voice analysis section 102 executes sound analysis of the inputted voice data at intervals of 15 ms for example, and converts the data into an input pattern (i.e. a time sequence of feature vectors which represent acoustic features of the voice data). Here, the feature vector may include voice power for example. As elements of the feature vector, cepstrum coefficients, LPC coefficients, variations of them, etc., which can be obtained by means of FFT analysis, linear predictive analysis, etc. can be used, as mentioned in the document No.7.

In the speaker independent reference pattern storing section 505, speaker independent reference patterns which represent acoustic features of speaker independent phonemes/syllables etc. are stored. The time correspondence section 506 links together the speaker independent phoneme/syllable reference patterns to generate a reference pattern of the specified text and a reference pattern of a password of one registered speaker who corresponds to the ID which has been inputted by the unknown speaker, establishes time-correspondence between the two generated reference patterns and the input pattern of the utterance by the unknown speaker by means of dynamic programming method (for example, according to the document No.3), and segments the input pattern of the unknown speaker into two parts (i.e. the first input pattern corresponding to the specified text and the second input pattern corresponding to the password) using the time-correspondence. Subsequently, the text verification section 507 executes the 'text verification' of the first input pattern, for example, according to the method of the document No.2, in which the text verification section 507 obtains the aforementioned two likelihoods, i.e. the first likelihood between the first input pattern and the reference pattern of the specified text and the second likelihood between the first input pattern and the reference pattern which can accept all possible phoneme sequence, and judges that the specified text has been correctly uttered by the unknown speaker if the difference between the first likelihood and the second likelihood is smaller than a threshold value.

The speaker identity verification section 808 executes the speaker identity verification according to the method of the document No. 4 or the document No. 5, in which the speaker identity verification section 808 executes text independent speaker verification between the first input pattern corresponding to the specified text and the second input pattern corresponding to the password. More concretely, the speaker identity verification section 808 calculates a text independent similarity between the first input pattern and the second input pattern, and judges that the first input pattern and the second input pattern have been uttered by the same speaker if the calculated text independent similarity is larger than a predetermined threshold value.

Incidentally, the speaker identity verification section 808 can execute the speaker identity verification using the aforementioned 'another' method. According to the method, the speaker identity verification section 808 executes the 'text independent speaker verification' according to the document No. 4 or No. 5, between the first input pattern and a plurality of predetermined speakers, and between the second input pattern and the same predetermined speakers. Then, the speaker identity verification section 808 judges that both the first input pattern corresponding to the specified text and the second input pattern corresponding to the password have been uttered by the same speaker, if a first group of speakers that are similar to the first input pattern according to the text independent speaker verification and a second group of speakers that are similar to the second input pattern according to the text independent speaker verification have similar composition of members. Concrete procedures for this method have been described in the above paragraph for 'another method for the extra judgment', and thus repeated description thereof is omitted here.

Further, the aforementioned 'one other' method can be used by the speaker identity verification section 808. According to the method, the speaker identity verification section 808 executes speaker adaptation to the speaker independent phoneme/syllable reference patterns by the speaker adaptation method shown in the document No. 6 for example, using the first input pattern corresponding to the specified text. Subsequently, the speaker identity verification section 808 obtains two similarities with regard to the second input pattern corresponding to the password, i.e. the first similarity between the second input pattern and the speaker independent phoneme/syllable reference patterns before the speaker adaptation, and the second similarity between the second input pattern and the speaker independent phoneme/syllable reference patterns after the speaker adaptation. Then, the speaker identity verification section 808 judges that both the first input pattern corresponding to the specified text and the second input pattern corresponding to the password have been uttered by the same speaker, if the similarity has been improved by the speaker adaptation by more than a predetermined threshold value.

In the speaker reference pattern storing section 103, a plurality of (speaker) reference patterns each of which representing acoustic features of a password which has been uttered by each registered speaker, are stored. The speaker adaptation section 714 executes speaker adaptation to a speaker reference pattern of a password of a registered speaker who corresponds to the inputted ID, using the first input pattern corresponding to the specified text, according to the method shown in the document No.6 for example. Subsequently, the similarity calculation section 511 obtains two similarities, i.e. the first similarity before the speaker adaptation and the second similarity after the speaker adaptation. Here, the first similarity before the speaker adaptation is the degree of similarity between the reference pattern of the password before the speaker adaptation and the second input pattern corresponding to the password, and the second similarity after the speaker adaptation is the degree of similarity between the reference pattern of the password after the speaker adaptation and the second input pattern corresponding to the password.

Then, the judgment section 512 of the fourth embodiment judges that the unknown speaker is the registered speaker himself/herself corresponding to the inputted ID if the following four conditions are satisfied:
 a. the result of the text verification by the text verification section 507 is affirmative;
 b. the first similarity before the speaker adaptation obtained by the similarity calculation section 511 is larger than a predetermined threshold value;
 c. the second similarity after the speaker adaptation obtained by the similarity calculation section 511 is larger than the first similarity before the speaker adaptation by more than another predetermined threshold value; and
 d. the result of the speaker identity verification by the speaker identity verification section 808 is affirmative;

And otherwise, the judgment section 512 judges that the unknown speaker is an impostor. The judgment is outputted to the output terminal 513.

As described above, according to the fourth embodiment, as the same effects as those of the third embodiment, the speaker identity verification between the first input pattern and the second input pattern is executed both indirectly and directly by the speaker adaptation section 714, the similarity calculation section 511, the speaker identity verification section 808 and the judgment section 512, thereby the vicious kind of imposture (by uttering the specified text on the spot and playing back a previously recorded and edited password of a registered speaker) can be avoided more precisely.

As set forth hereinabove, by the speaker recognition device according to the present invention, imposture by voice recording can be effectively avoided, without heavy tasks of the speakers to be registered and without large storage capacity of the device for storing reference patterns for verification. Further, the vicious kind of imposture (by uttering the specified text on the spot and playing back a previously recorded and edited password of a registered speaker) can be avoided by means of the direct or indirect speaker identity verification between the specified text and the password.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A speaker recognition device for judging whether or not an unknown speaker is an authentic registered speaker, wherein the speaker recognition device includes a digital processor programmed to:
 1) instruct the unknown speaker to input an ID of the unknown speaker and utter a specified text designated by the speaker recognition device and a password of the unknown speaker,
 2) input the ID and the utterance of the specified text and the password from the unknown speaker, and
 3) determine that the unknown speaker is the authentic registered, speaker if each of the following conditions are satisfied:
  a. the specified text uttered by the unknown speaker is the same as the specified text designated by the speaker recognition device: and
  b. the degree of similarity between acoustic features of the password uttered by the unknown speaker and acoustic features of the password uttered by the authentic registered speaker who corresponds to the inputted ID is larger than a predetermined threshold value; and
 wherein the specified text is independent of stored acoustic features of the authentic registered speaker.

2. A speaker recognition device for judging whether or not an unknown speaker is an authentic registered speaker, wherein the speaker recognition device includes a digital processor programmed to:
 1) instruct the unknown speaker to input an ID of the unknown speaker and utter a specified text designated by the speaker recognition device and a password of the unknown speaker,
 2) input the ID and the utterance of the specified text and the password from the unknown speaker, and
 3) determine that the unknown speaker is the authentic registered speaker if each of the following conditions are satisfied:
  a. the specified text uttered by the unknown speaker is the same as the specified text designated by the speaker recognition device;

b. the degree of similarity between acoustic features of the password uttered by the unknown speaker and acoustic features of the password uttered by the authentic registered speaker who corresponds to the inputted ID is larger than a predetermined threshold value;

c. the specified text and the password are judged to have been uttered by the same speaker; and wherein the specified text is independent of stored acoustic features of the authentic registered speaker.

3. A speaker recognition device for judging whether or not an unknown speaker is an authentic registered speaker comprising:

1) a text generation section for generating a specified text to be uttered by an unknown speaker;

2) a presentation section for instructing the unknown speaker to utter the specified text together with a password of the unknown speaker;

3) a voice input section for receiving the utterance of the specified text and the password of the unknown speaker;

4) a speaker information input section for receiving an ID of a registered speaker which is inputted by the unknown speaker;

5) a speaker independent reference pattern storing section for storing speaker independent reference patterns which represent acoustic features of speaker independent phonemes/syllables which are independent of stored acoustic features of the authentic registered speaker by which an arbitrary text is generated;

6) a speaker reference pattern storing section for storing a plurality of speaker reference patterns each of which representing acoustic features of a password which has been uttered by each registered speaker;

7) a voice analysis section for executing sound analysis of a voice waveform of the utterance of the unknown speaker and generating an input pattern by extracting feature values from the voice waveform;

8) a time correspondence section for linking together
  a. the speaker independent phoneme/syllable reference patterns stored in the speaker independent reference pattern storing section and generating a first reference pattern of the specified text and
  b. a second reference pattern of a password of one registered speaker who corresponds to an ID which has been inputted to the speaker information input section by the unknown speaker, said time correspondence section establishing time-correspondence between the first and second generated reference patterns and the input pattern generated by the voice analysis section, and segmenting the input pattern into a first input pattern corresponding to the specified text and a second input pattern corresponding to the password using the time-correspondence;

9) a text verification section for judging whether or not text contents of the first input pattern corresponding to the specified text are the same as text contents of the specified text generated by the text generation section independently of any stored acoustic features of the authentic registered speaker;

10) a similarity calculation section for obtaining the degree of similarity between a speaker reference pattern stored in the speaker reference pattern storing section which corresponds to the ID inputted by the unknown speaker and the second input pattern corresponding to the password; and 11) a judgment section for judging that the unknown speaker is the authentic registered speaker if the following conditions are satisfied:
  a. the result of the judgment by the text verification section is affirmative; and
  b. the degree of similarity calculated by the similarity calculation section is larger than a predetermined threshold value.

4. A speaker recognition device as claimed in claim 3, further comprising a speaker identity verification section for verifying speaker identity between the first input pattern corresponding to the specified text and the second input pattern corresponding to the password, wherein the judgment section judges that the unknown speaker is the authentic registered speaker if the following additional condition is satisfied by the judgment section:
  a. the result of the speaker identity verification by the speaker identity verification section is affirmative.

5. A speaker recognition device as claimed in claim 3, wherein the text verification section obtains a first likelihood between the first input pattern and the reference pattern of the specified text and a second likelihood between the first input pattern and a reference pattern which can accept all possible phoneme sequence, and judges that the text contents of the first input pattern are the same as the text contents of the specified text generated by the text generation section if the difference between the first likelihood and the second likelihood is smaller than a threshold value.

6. A speaker recognition device as claimed in claim 4, wherein the text verification section obtains a first likelihood between the first input pattern and the reference pattern of the specified text and a second likelihood between the first input pattern and a reference pattern which can accept all possible phoneme sequence, and judges that the text contents of the first input pattern are the same as the text contents of the specified text generated by the text generation section if the difference between the first likelihood and the second likelihood is smaller than a threshold value.

7. A speaker recognition device as claimed in claim 4 wherein the speaker identity verification section calculates a text independent similarity between the first input pattern corresponding to the specified text and the second input pattern corresponding to the password, and judges that both the first input pattern and the second input pattern have been uttered by the same speaker if the calculated text independent similarity is larger than a predetermined threshold value.

8. A speaker recognition device as claimed in claim 4, wherein the speaker identity verification section obtains a first text independent similarity and a second text independent similarity with regard to each of a plurality of predetermined speakers, in which the first text independent similarity being the degree of text independent similarity between the first input pattern and a speaker dependent reference pattern of one of the predetermined speakers which can accept all possible phoneme sequence, and the second similarity being the degree of text independent similarity between the second input pattern and the speaker dependent reference pattern of the one of the predetermined speakers which can accept all possible phoneme sequence, and the speaker identity verification section judges that both the first input pattern and the second input pattern have been uttered by the same speaker if a first group of speakers whose first text independent similarities are large and a second group of speakers whose second text independent similarities are large have similar composition of members.

9. A speaker recognition device as claimed in claim 4, wherein the speaker identity verification section executes speaker adaptation to speaker independent phoneme/syllable reference patterns using one of the first input pattern and the second input pattern, obtains a first similarity and a second similarity with regard to the other one of the first input pattern and the second input pattern, in which the first similarity being the degree of similarity between the other one and the speaker independent phoneme/syllable reference patterns before the speaker adaptation, and the second similarity being the degree of similarity between the other one and the speaker independent phoneme/syllable reference patterns after the speaker adaptation, and judges that both the first input pattern and the second input pattern have been uttered by the same speaker if the second similarity is larger than the first similarity by more than a predetermined threshold value.

10. A speaker recognition device as claimed in claim 3, wherein the speaker reference pattern storing section further stores text contents of each password which has been uttered by each registered speaker, and the time correspondence section utilizes the text contents for generating the reference pattern of the password which corresponds to the inputted ID.

11. A speaker recognition device as claimed in claim 3 wherein the time correspondence section utilizes a speaker independent phoneme/syllable reference pattern which can accept all possible phoneme sequence for generating the reference pattern of the password which corresponds to the inputted ID.

12. A speaker recognition device for judging whether or not an unknown speaker is an authentic registered speaker comprising:

1) a text generation section for generating a specified text to be uttered by an unknown speaker;

2) a presentation section for instructing the unknown speaker to utter the specified text together with a password of the unknown speaker;

3) a voice input section for receiving the utterance of the specified text and the password of the unknown speaker;

4) a speaker information input section for receiving an ID of a registered speaker which is inputted by the unknown speaker;

5) a speaker independent reference pattern storing section for storing speaker independent reference patterns which represent acoustic features of speaker independent phonemes/syllables which are independent of stored acoustic features of the authentic registered speaker by which an arbitrary text is generated;

6) a speaker reference pattern storing section for storing a plurality of speaker reference patterns each of which representing acoustic features of a password which has been uttered by each registered speaker;

7) a voice analysis section for executing sound analysis of a voice waveform of the utterance of the unknown speaker and generating an input pattern by extracting feature values from the voice waveform;

8) a time correspondence section for linking together
   a. the speaker independent phoneme/syllable reference patterns stored in the speaker independent reference pattern storing section and generating a first reference pattern of the specified text and
   b. a second reference pattern of a password of one registered speaker who corresponds to an ID which has been inputted to the speaker information input section by the unknown speaker, said time correspondence section establishing time-correspondence between the first and second generated reference patterns and the input pattern generated by the voice analysis section, and segmenting the input pattern into a first input pattern corresponding to the specified text and a second input pattern corresponding to the password using the time-correspondence;

9) a text verification section for judging whether or not text contents of the first input pattern corresponding to the specified text are the same as text contents of the specified text generated by the text generation section independently of any stored acoustic features of the authentic registered speaker;

10) a speaker adaptation section for executing speaker adaptation to a speaker reference pattern which corresponds to the inputted ID using the first input pattern corresponding to the specified text:

11) a similarity calculation section for obtaining a first similarity before the speaker adaptation and a second similarity after the speaker adaptation, in which the first similarity before the speaker adaptation being the degree of similarity between the speaker reference pattern before the speaker adaptation and the second input pattern corresponding to the password, and the second similarity after the speaker adaptation being the degree of similarity between the speaker reference pattern after the speaker adaptation and the second input pattern corresponding to the password; and a judgment section for judging that the unknown speaker is the authentic registered speaker if the following conditions are satisfied:
   a. the result of the judgment by the text verification section is affirmative;
   b. the first similarity before the speaker adaptation obtained by the similarity calculation section is larger than a predetermined threshold value; and
   c. the second similarity after the speaker adaptation obtained by the similarity calculation section is larger than the first similarity before the speaker adaptation by more than another predetermined threshold value.

13. A speaker recognition device as claimed in claim 12, further comprising a speaker identity verification section for verifying speaker identity between the first input pattern corresponding to the specified text and the second input pattern corresponding to the password, wherein the judgment section judges that the unknown speaker is the authentic registered speaker if the following additional condition is satisfied by the judgment section:
   a. the result of the speaker identity verification by the speaker identity verification section is affirmative.

14. A speaker recognition device as claimed in claim 12, wherein the text verification section obtains a first likelihood between the first input pattern and the reference pattern of the specified text and a second likelihood between the first input pattern and a reference pattern which can accept all possible phoneme sequence, and judges that the text contents of the first input pattern are the same as the text contents of the specified text generated by the text generation section if the difference between the first likelihood and the second likelihood is smaller than a threshold value.

15. A speaker recognition device as claimed in claim 13, wherein the text verification section obtains a first likelihood between the first input pattern and the reference pattern of the specified text and a second likelihood between the first input pattern and a reference pattern which can accept all possible phoneme sequence, and judges that the text contents of the first input pattern are the same as the text contents of the specified text generated by the text generation section if the difference between the first likelihood and the second likelihood is smaller than a threshold value.

16. A speaker recognition device as claimed in claim 13, wherein the speaker identity verification section calculates a text independent similarity between the first input pattern corresponding to the specified text and the second input pattern corresponding to the password, and judges that both the first input pattern and the second input pattern have been uttered by the same speaker if the calculated text independent similarity is larger than a predetermined threshold value.

17. A speaker recognition device as claimed in claim 13, wherein the speaker identity verification section obtains a first text independent similarity and a second text independent similarity with regard to each of a plurality of predetermined speakers, in which the first text independent similarity being the degree of text independent similarity between the first input pattern and a speaker dependent reference pattern of one of the predetermined speakers which can accept all possible phoneme sequence, and the second similarity being the degree of text independent similarity between the second input pattern and the speaker dependent reference pattern of the one of the predetermined speakers which can accept all possible phoneme sequence, and the speaker identity verification section judges that both the first input pattern and the second input pattern have been uttered by the same speaker if a first group of speakers whose first text independent similarities are large and a second group of speakers whose second text independent similarities are large have similar composition of members.

18. A speaker recognition device as claimed in claim 13, wherein the speaker identity verification section executes speaker adaptation to speaker independent phoneme/syllable reference patterns using one of the first input pattern and the second input pattern, obtains a first similarity and a second similarity with regard to the other one of the first input pattern and the second input pattern, in which the first similarity being the degree of similarity between the other one and the speaker independent phoneme/syllable reference patterns before the speaker adaptation, and the second similarity being the degree of similarity between the other one and the speaker independent phoneme/syllable reference patterns after the speaker adaptation, and judges that both the first input pattern and the second input pattern have been uttered by the same speaker if the second similarity is larger than the first similarity by more than a predetermined threshold value.

19. A speaker recognition device as claimed in claim 12, wherein the speaker reference pattern storing section further stores text contents of each password which has been uttered by each registered speaker, and the time correspondence section utilizes the text contents for generating the reference pattern of the password which corresponds to the inputted ID.

20. A speaker recognition device as claimed in claim 12, wherein the time correspondence section utilizes a speaker independent phoneme/syllable reference pattern which can accept all possible phoneme sequence for generating the reference pattern of the password which corresponds to the inputted ID.

* * * * *